United States Patent [19]

Morris et al.

[11] Patent Number: 4,796,066

[45] Date of Patent: Jan. 3, 1989

[54] PRINTER APPARATUS HAVING TWO-SIDED PRINTING CAPABILITY

[75] Inventors: Scott S. Morris, Oklahoma City, Okla.; George R. Daniels, Glendale, Ariz.

[73] Assignee: Honeywell Bull Inc., Minneapolis, Minn.

[21] Appl. No.: 74,201

[22] Filed: Jul. 16, 1987

[51] Int. Cl.[4] ........................ G03B 27/32; G03B 27/52

[52] U.S. Cl. .......................................... 355/26; 355/29

[58] Field of Search .................................... 355/24–26, 355/50, 89, 90, 27, 28

[56] References Cited

U.S. PATENT DOCUMENTS 3,580,670 5/1971 Bhagat .............................. 355/26 X

*Primary Examiner*—Richard A. Wintercorn

*Attorney, Agent, or Firm*—John S. Solakian

[57] ABSTRACT

A printer apparatus having two-sided printing capability is taught. Two printing mechanisms are provided that can simultaneously print both sides of roll paper. The printing mechanisms are physically oriented with respect to each other and to a simple paper handling/routing mechanism comprised of rollers so that when only one printing mechanism is installed to provide only one-sided printing, the paper handling mechanism need not be modified but the roll paper is merley routed differently around the rollers. Retroactively, a second printing mechanism may simply be installed in the printer for two-sided printing and the roll paper is routed around the rollers differently to route the roll paper to and from the second printing mechanism.

9 Claims, 1 Drawing Sheet

PRINTER APPARATUS HAVING TWO-SIDED PRINTING CAPABILITY

FIELD OF THE INVENTION

This invention relates to printers and more particularly to a modular printer usable in data processing environment and that may be easily set up to perform single sided or double sided printing.

BACKGROUND OF THE INVENTION

In the prior art there are many types of printers that are used with data processing equipment. Examples of such prior art printers are impact printers which include daisy wheel and dot matrix printers, and laser printers which use a copier process coupled with a laser that writes the material to be printed to an image drum within the printer. There are also many other types of prior art printers. All these prior art data processing printers only do one sided printing, and to accomplish two sided printing, paper already printed on one side must be placed back into the printer to have the reverse side printed. This is an awkward, time consuming process, and mistakes are often made in the process. Attempts to create two-sided printers have resulted in printers having complex paper handling apparatus that print first on one side of the paper and afterwards print on the other side of the paper. Such two-sided printers are expensive and require frequent maintenance, usually by a skilled technician, due to their complicated construction. In addition, one-sided and two-sided printers are separate products and a user of a single-sided printer cannot easily upgrade their one-sided printer to a two-sided printer. Customers must therefore obtain a separate two-sided printer. This usually leaves customers with two printers when all they need is one printer.

Accordingly, there is a need in the art for a printer that can easily and quickly be changed from a one-sided printer to a two-sided printer. In addition, there is a need for a printer that has a relatively simple paper handling mechanism that is used for both one-sided and two-sided printing. There is also a need for a printer that can perform two-sided printing without having to reload paper already printed on one side back into the printer, and that can perform two-sided printing at a much faster rate than heretofore possible. There is also a need in the art for a modular printer having two modular printer mechanisms that can quickly and easily be mounted in or removed from the printer to provide single or double sided printing, for ease of cleaning, other maintenance, and replacement of the printing mechanisms, and that can still provide one-sided printing when one of the two printer mechanisms is disabled.

SUMMARY OF THE INVENTION

The above stated needs of the prior art are met by the novel printer disclosed and claimed herein. The novel printer has a simple paper handling mechanism, is modular, and can be easily and quickly converted from a one-sided printer to a two-sided printer for minimal expense. In addition, the present printer performs front and backside printing at the same time to speed up the printing process while avoiding the need for a complex paper handling mechanism to perform two-sided printing. Further, when part of the printing mechanisms is disabled the printer can still provide one-sided printing.

DESCRIPTION OF THE DRAWING

The invention will be better understood upon reading the following detailed description in conjunction with the drawing in which.

DETAILED DESCRIPTION

Figure 1:
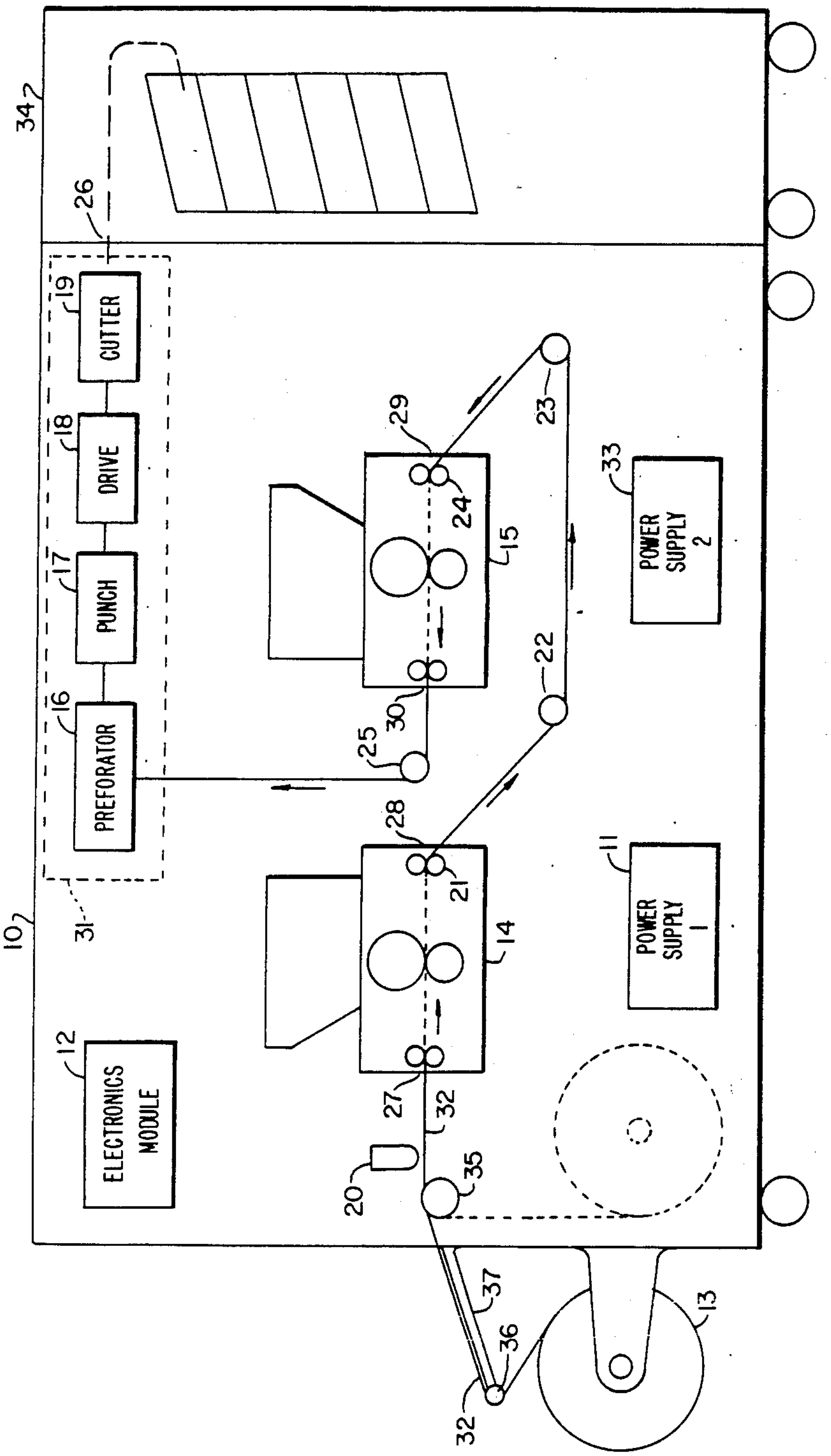
FIG. 1 is a front view of the inside of a housing containing the modular printer having a simple paper handling mechanism and that can be equipped with one or two printing mechanisms to perform one-sided or two-sided printing.

In FIG. 1 is seen a front view of a printer housing 10 in which are conveniently located a number of modules that make up the printer. Located in the bottom of housing 10 are power supplies 11 and 33 that are both connected to AC power and provide the power to all the other modules inside of housing 10. Supplies 11 and 33 each may conveniently be made up of a number of smaller modular power supplies (not shown) that may be easily accessed for maintenance or replacement. These power supplies are heavy and by mounting them in the bottom of housing 10 the center of gravity of the printer is lowered for safety considerations. When only one printing means 14 or 15 is provided only one of the power supplies are provided, and when both these printing means are provided both power supplies are provided.

There is also an electronics module 12 mounted at the top left of housing 11 where it is easily accessible from the top for testing, maintenance and replacement. Module 12 is not shown in any detail since its function and makeup are well known in the art, but advantageously uses plug in printed circuit cards. The printed circuit cards are easily and quickly replaced to speed up maintenance and repairs, and also permits fast upgrading of the electronics. Electronics module 12 has the logic that basically controls all the other modules inside of housing 10, and receives, stores, and initially processes the electronic signals that indicate the alphanumeric and other images to be printed.

The printer described herein preferably uses a roll of paper 13 that is to be printed on, rather than using discrete sheets of paper from a sheet feeder. The use of a roll of paper 13 simplifies the handling of paper 32 between the modules inside of printer housing 10. However, it should be understood that one skilled in the art may modify the printer to print on individual sheets of paper. In FIG. 1 paper roll 13 is shown mounted external to printer housing 10 for ease of replacing the paper roll. External mounting is the preferred embodiment of the invention and permits larger diameter rolls to be used, but paper roll 13 may alternatively be mounted within to printer housing 10 as shown in dotted lines. With the alternate internal mounting only smaller diameter rolls of paper may be used.

Also mounted inside of housing 10 are two modular and identical printing mechanisms 14 and 15. These printing mechanisms are known in the art and are advantageously laser printing mechanisms, but may also be other printing mechanisms known in the art. Because laser printing mechanisms are well known in the art they are only described very briefly herein to avoid detracting from the desription of the invention. Laser printing mechanisms are basically comprised of a copier mechanism which uses a special coated drum on which the image to be printed is created as an electrostatic image which is then developed using a dry or wet toner.

The toner image is then transferred to sheet or roll paper passing through the mechanism and is then fixed thereon by a number of means including heat. To create the image to be printed on the drum a laser beam is deflected over the surface of the drum responsive to electronic signals which indicate the alphanumeric and other images that are to be printed on the paper. As is known in the art an almost infinite range of images and characters may be printed with a laser printer coupled to a microprocessor arrangement. The cooperation of printing mechanisms 14 and 15 to perform two-sided and one-sided printing described further in this specification.

Mounted inside of printer housing 10 are also other well known modules needed to handle roll paper. They are a perforator 16 used to perforate the paper at the point at which a sheet is to be formed, a punch mechanism 17 used to punch round holes through the edge of each copy sheet for mounting in binders, a drive station 18, and a paper cutter 19 for cutting the roll paper into individual sheets. Modules 16, 17, 18 and 19 are preferably mounted on a subchassis 31 for ease of removal for maintenance and replacement. Individual cut sheets of paper printed on one or both sides leave cutter 19, exit printer housing 10 at exit 26 and are collated or otherwise stacked by an external stacking assembly 34 in a manner well known in the art.

In operation of the printer, paper 32 from paper roll 13 first passes around a roller 36 at the end of splice station 37. Station 37 is the point at which the paper at the beginning of a new roll paper is spliced to the end of a just depleted roll of paper. This is done so that the new roll of paper need not be rerouted through the mechanisms inside printer 10. Paper 32 then enters the housing of printer 10, passes over roller 35 and past sensor 20 which senses the presence of paper in a manner well known in the printer art. When the paper on roll 13 is depleted the absence of paper is detected by sensor 20 which provides a signal to electronics module 12 that causes the printer to stop, and a paper roll replace signal to be given until an empty paper roll 13 is replaced with a new roll of paper. The end of the depleted roll is spliced to the beginning of a new roll at splice station 37 as previously mentioned.

The paper 32 from paper roll 13 then enters the first modular printer mechanism 14 at input 27 and alphanumeric characters and other images are printed on a first or front side of the paper in a manner well known in the art. The paper then passes through rollers 21 at the exit of printer mechanism 14 and passes over a first paper handling means comprising rollers 22 and 23 to the input 29 of the second modular printer mechanism 15 where the paper passes through rollers 24. By orienting printer mechanism 15 with its input 29 to the right and passing the paper around to input 29, the paper is inverted so that the second or backside thereof may be printed thereon in mechanism 15 to provide two-sided printing. It should be noted, as illustrated in FIG. 1, that the directions of paper movement through printer mechanisms 14 and 15 are substantially parallel, but in opposite directions. The paper exits mechanism 15 at exit 30, passes around a second paper handling means comprising roller 25 and enters perforator 16 on subchassis 31. After passing through perforator 16, punch 17, drive 18 and cutter 19, individual sheets of paper printed on both sides are output from printer housing 10 at exit 26. Printed sheets of paper exiting printer housing 10 enter stacking mechanism 34 which collates or otherwise stacks the printed sheets of paper in a manner well known in the art. Because paper collating/stacking mechanisms are so well known in the art, assembly 34 is not disclosed in any detail herein to avoid detracting from the description of the invention.

Processing modules 16, 17, 18, and 19 are preferably mounted on a single subchassis 31 so each module may easily be removed as a unit for maintenance or replacement. This helps provide access to printer mechanisms 14 and 15 for cleaning, adjustment, removal, replacement, and installation.

With printer mechanisms 14 and 15 respectively providing the front side and backside printing on the paper, it is obvious that there is a time delay between printing the front side and printing the backside of the paper. When only a single sheet of paper is being printed on both sides by the printer, there is not much savings in printing time. However, when a large number of sheets are being printed there is an appreciable savings in printing time. After the front or first side of a first sheet is printed in printer mechanism 14, it is having its backside or second side printed in printer mechanism 15 at the same time that the front side of another sheet is being printed in printer mechanism 14. This simultaneous two-sided operation increases the printing speed of the printer.

When a customer wants a simpler printer configuration capable of only one-sided printing, printer mechanism 15 and its associated power supply 33 are not installed and the paper exiting first printer mechanism 14 at exit 28 is routed to pass around roller 25 and go directly to perforator 16. The paper does not pass around rollers 22 and 23 for one-sided printing with this configuration of the printer. Even if the printer is equipped with both printer mechanisms 14 and 15 for two-sided printing, paper 32 from roll 13 may still be routed as just described in the last two sentences when one sided printing is all that is desired or printer mechanism 15 is malfunctioning. Selectively, one sided printing may still be done by only one of the two printing mechanisms 14 or 15 when they are both provided in the printer. This capability is implemented by operating switches in electronics module 12 to select the routing and timing of images signals to the one of printing mechanisms 14 or 15 that is selected to do the one-sided printing in a manner known in the art. This capability extends the usefulness of the printer by permitting the printer to be used for one-sided printing after one of the printing mechanisms 14 or 15 has become defective and in need of repair or replacement.

After a one-sided printer configuration has been installed for a customer, the customer may change their mind and the second printer mechanism 15 and its associated power supply 33 may be quickly and easily installed at the customer's site. The customer need not change printers or add a second printer as must presently be done in the art. This flexibility is created because of the novel physical orientation of rollers 22 and 23 and printer mechanisms 14 and 15 and the simple paper handling that is provided by the rollers. As a result of this novel, simple, inexpensive paper handling arrangement the paper handling mechanisms need not be physically modified in any way to perform one-sided or two-sided printing.

While what has been described hereinabove is the preferred embodiment of the invention, it should be understood that numerous changes may be made without departing from the spirit and scope of the invention.

For instance, printer mechanism 15 may be reversed so that its input 29 faces the output 28 of printer mechanism 14.

What we claim is:

1. A printer capable of simultaneously performing front and backside printing on paper responsive to electronic input signals indicating images to be printed on the paper, said printer comprising:

a printer housing;

a first modular printing means mounted in said printer housing and being responsive to said electronic input signals for printing on a first side of said paper, said first printing means having an input via which said paper enters said first printing means, and an output via which said paper exits said first printing means after having been printed on said first side, said paper moving through the first printing means in a first direction;

a second modular printing means mounted in said printer housing and responsive to said electronic input signals for printing on a second side of said paper, said second printing means having an input via which said paper enters said second printing means, and an output via which said paper exits said second printing means after having been printed on said second side, said paper moving through the second means in a second direction, said first and second directions being substantially parallel, but opposite;

an output station for processing said paper after it has been printed on by one or both of said first and second printing means; and paper handling means having two states, a first state for routing paper from the output of said first printing means to the input of said second printing means and from the output of the second printing means to said output station, and a second state for routing paper from the output of said first printing means directly to the output station.

2. The invention in accordance with claim 1 wherein said paper is a roll of paper that is mounted external to said printer housing for ease of changing rolls of paper.

3. The invention in accordance with claim 2 further comprising a splicing means over which said paper from said roll of paper passes before being printed on by said first printing means, said splicing means being used to splice the end of a depleted roll of paper with the beginning of a new roll of paper so that said new roll of paper need not be routed through said first and second printing means, said first and second paper handling means, and said output station.

4. The invention in accordance with claim 3 further comprising means for sensing the end of the paper on said depleted roll of paper so that it may be spliced to the beginning of said new roll of paper using said splicing means.

5. The invention in accordance with claim 1 wherein said first and second printing means are laser printing machines.

6. A modular data processing printer capable of simultaneously printing on the front and the backside of paper responsive to electrical input signals indicating alphanumeric characters and images to be printed on both sides of the paper, said printer comprising the combination of:

a printer housing;

a first modular printing means mounted is said printer housing and responsive to said input signals for printing on a first side of said paper, said first printing means having an input via which said paper enter said first printing means, and an output via which said paper exits said first printing means after having been printed on, said paper moving through the first printing means in a first direction;

a second modular printing means mounted in said printer housing and responsive to said input signals for printing on a second side of said paper, said second printing means having an input via which said paper enters said second printing means and an output via which said paper exits said second printing means after having been printed on said second side, said second modular printing means being substantially identical to said first modular printing means, and said second printing means being mounted in close proximity to said first printing means inside said printer housing, said paper moving through the second printing means in a second direction, said first and second directions of movement of the paper through the first and second printing means being substantially parallel to one another, but in opposite directions;

an output station for processing said paper after it has been printed on by one or both of said first and second printing means;

first paper handling means used for routing said paper from the output of the first printing means to the input of the second printing means; and second paper handling means for routing said paper from the output of the second printing means to the output station, and when the second printing means is disabled, or not provided, for routing paper exiting the first printing means directly to the output station.

7. The invention in accordance with claim 6 wherein said paper is a roll of paper mounted either internally to said printer housing or externally to said printer housing for ease of changing rolls of paper, and wherein said paper from said roll passes first through said first printing means and then via said first paper handling means to said second printing means to accomplish two-sided printing, and there is a time delay between the time that a first portion of said paper is printed on said first side by said first printing means and is printed on said second side by said second printing means, and when a number of pages are to be printed by said printer the second side of the first portion of said paper is being printed by said second printing means at the same time that the first side of a second portion of said paper is being printed by said first printing means.

8. The invention in accordance with claim 7 wherein when one sided copying is to be selectively performed said paper is selectively routed either to said second printing means by said first paper handling means but is not printed on by said second printing means, or is directly routed by said second paper handling means from the output of said first printing means to said output station.

9. The invention in accordance with claim 6 wherein said first and said second printing means are laser printing machines.

* * * * *